(12) United States Patent
Park et al.

(10) Patent No.: US 12,308,415 B2
(45) Date of Patent: May 20, 2025

(54) POSITIVE ELECTRODE ACTIVE MATERIAL FOR SECONDARY BATTERY, METHOD OF PREPARING THE SAME, AND LITHIUM SECONDARY BATTERY INCLUDING THE SAME

(71) Applicant: LG Chem, Ltd., Seoul (KR)

(72) Inventors: Sung Bin Park, Daejeon (KR); Dong Hun Lee, Daejeon (KR); Hyung Man Cho, Daejeon (KR); Jung Min Han, Daejeon (KR); Jin Tae Hwang, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1034 days.

(21) Appl. No.: 16/979,401

(22) PCT Filed: May 15, 2019

(86) PCT No.: PCT/KR2019/005807
§ 371 (c)(1),
(2) Date: Sep. 9, 2020

(87) PCT Pub. No.: WO2019/221497
PCT Pub. Date: Nov. 21, 2019

(65) Prior Publication Data
US 2021/0135187 A1    May 6, 2021

(30) Foreign Application Priority Data

May 17, 2018   (KR) .................. 10-2018-0056751

(51) Int. Cl.
*H01M 4/131*      (2010.01)
*H01M 4/02*       (2006.01)
(Continued)

(52) U.S. Cl.
CPC ......... *H01M 4/131* (2013.01); *H01M 4/0471* (2013.01); *H01M 4/134* (2013.01);
(Continued)

(58) Field of Classification Search
CPC ...... H01M 4/131; H01M 4/505; H01M 4/525; H01M 10/0525
See application file for complete search history.

(56) References Cited

U.S. PATENT DOCUMENTS

| 2005/0175897 A1 | 8/2005 | Jung et al. |
| 2007/0231691 A1 | 10/2007 | Abe et al. |

(Continued)

FOREIGN PATENT DOCUMENTS

| CN | 104282903 A | 1/2015 |
| CN | 105185982 A | 12/2015 |

(Continued)

OTHER PUBLICATIONS

Kim, Yongseon. "Lithium nickel cobalt manganese oxide synthesized using alkali chloride flux: morphology and performance as a cathode material for lithium ion batteries." ACS applied materials & interfaces 4.5 (2012): 2329-2333. (Year: 2012).*

(Continued)

*Primary Examiner* — Allison Bourke
*Assistant Examiner* — Kayla Elaine Clary
(74) *Attorney, Agent, or Firm* — Lerner David LLP (57) ABSTRACT

The present invention relates to a positive electrode active material for a secondary battery which includes a lithium composite transition metal oxide including nickel (Ni), cobalt (Co), and manganese (Mn), wherein the lithium composite transition metal oxide includes the nickel (Ni) in an amount of 65 mol % or more and the manganese (Mn) in an amount of 5 mol % or more based on a total amount of transition metals, and wherein the electrode positive active (Continued)

material is composed of a single particle, having a crystallite size of 180 nm or more.

12 Claims, 5 Drawing Sheets

(51) Int. Cl.
    *H01M 4/04*           (2006.01)
    *H01M 4/134*         (2010.01)
    *H01M 4/1391*       (2010.01)
    *H01M 4/1395*       (2010.01)
    *H01M 4/36*          (2006.01)
    *H01M 4/505*         (2010.01)
    *H01M 4/525*         (2010.01)
    *H01M 10/0525*      (2010.01)

(52) U.S. Cl.
    CPC ....... *H01M 4/1391* (2013.01); *H01M 4/1395* (2013.01); *H01M 4/364* (2013.01); *H01M 4/505* (2013.01); *H01M 4/525* (2013.01); *H01M 10/0525* (2013.01); *H01M 2004/028* (2013.01)

(56) References Cited

U.S. PATENT DOCUMENTS

| | | | |
|---|---|---|---|
| 2010/0068624 | A1 | 3/2010 | Hiratsuka et al. |
| 2011/0291044 | A1 | 12/2011 | Wang et al. |
| 2012/0070743 | A1 | 3/2012 | Kwon et al. |
| 2012/0074351 | A1 | 3/2012 | Levasseur et al. |
| 2014/0054495 | A1* | 2/2014 | Paulsen ................ H01M 4/505 429/223 |
| 2014/0205898 | A1 | 7/2014 | Lee et al. |
| 2015/0010819 | A1 | 1/2015 | Lee et al. |
| 2015/0280211 | A1 | 10/2015 | Kikuya et al. |
| 2016/0164093 | A1* | 6/2016 | Inoue ................... H01M 4/505 429/223 |
| 2017/0288223 | A1 | 10/2017 | Ogawa et al. |
| 2018/0083262 | A1 | 3/2018 | Zhou et al. |
| 2018/0198122 | A1 | 7/2018 | Hiratsuka et al. |
| 2020/0052295 | A1 | 2/2020 | Koshika et al. |
| 2020/0203728 | A1 | 6/2020 | Ogawa et al. |
| 2020/0365874 | A1 | 11/2020 | Wang et al. |
| 2021/0143423 | A1* | 5/2021 | Paulsen ................ H01M 4/505 |
| 2022/0293939 | A1 | 9/2022 | Ogawa et al. |
| 2022/0336804 | A1* | 10/2022 | Xin ................... H01M 10/0525 |

FOREIGN PATENT DOCUMENTS

| | | | | |
|---|---|---|---|---|
| CN | 106450155 | A | | 2/2017 |
| CN | 107275573 | A | | 10/2017 |
| CN | 107804879 | A | * 3/2018 | ............. B82Y 30/00 |
| EP | 2910528 | A1 | | 8/2015 |
| EP | 3533764 | A1 | | 9/2019 |
| JP | 2006054159 | A | | 2/2006 |
| JP | 2007273108 | A | | 10/2007 |
| JP | 2008181839 | A | | 8/2008 |
| JP | 2012119093 | A | | 6/2012 |
| JP | 4995061 | B2 | | 8/2012 |
| JP | 2013082581 | A | | 5/2013 |
| JP | 2013157109 | A | | 8/2013 |
| JP | 6026403 | B2 | | 11/2016 |
| JP | 2017188445 | A | | 10/2017 |
| JP | 2018037393 | A | | 3/2018 |
| JP | 2018070419 | A | | 5/2018 |
| KR | 100570616 | B1 | | 4/2006 |
| KR | 20110128862 | A | | 11/2011 |
| KR | 20120030774 | A | | 3/2012 |
| KR | 101338816 | B1 | | 12/2013 |
| KR | 20140093529 | A | | 7/2014 |
| KR | 20150006283 | A | | 1/2015 |
| KR | 20180013512 | A | | 2/2018 |
| WO | 2014061654 | A1 | | 4/2014 |
| WO | 2014103166 | A1 | | 7/2014 |
| WO | 2018079809 | A1 | | 5/2018 |

OTHER PUBLICATIONS

Liang, Wenbiao, et al. "Synthesis of single-crystal LiNi0. 8Co0. 1Mn0. 1O2 materials for Li-ion batteries by microfluidic technology." Chemical Engineering Journal 464 (2023): 142656. (Year: 2023).*

Li, Hongyang, et al. "Synthesis of single crystal LiNi0. 6Mn0. 2Co0. 2O2 with enhanced electrochemical performance for lithium ion batteries." Journal of the electrochemical society 165.5 (2018): A1038-A1045. (Year: 2018).*

He et al. "Sufficient utilization of zirconium ions to improve the structure and surface properties of nickel-rich cathode materials for lithium-ion batteries." ChemSusChem 11.10 (2018): 1639-1648. (Year: 2018)*

Search Report dated Nov. 20, 2022 from Office Action for Chinese Application No. 201980017143.4 issued Nov. 25, 2022. 3 pgs.

Extended European Search Report for Application No. 19804127.9, dated Mar. 19, 2021, 7 pages.

Yi-Jie Gu et al., "Structural characterization of layered LiNi0.85? xMnxCo0. 15O2 with x=0, 0.1, 0.2 and 0.4 oxide electrodes for Li batteries" Journal of Alloys and Compounds, Elsevier, Sequoia, Lausanne, CH, vol. 509, No. 30, May 9, 2011, pp. 7915-7921.

International Search Report for PCT/KR2019/005807 dated Aug. 21, 2019.

Zhang, M. et al., "Yttrium modified Ni-rich LiNiO. 8Co0. 1 MnO. 1O2 with enhanced electrochemical performance as high energy density cathode material at 4.5 V high voltage." Journal of Alloys and Compounds, 774(2018), pp. 82-92.

Noh, H.J. et al. "Comparison of the structural and electrochemical properties of layered Li [NixCoyMnz] O2 (x= ⅓, 0.5, 0.6, 0.7, 0.8 and 0.85) cathode material for lithium-ion batteries." Journal of Power Sources 233 (2013), pp. 121-130.

Extended European Search Report including Written Opinion for Application No. 24155268.6 dated May 13, 2024, pp. 1-6.

* cited by examiner

POSITIVE ELECTRODE ACTIVE MATERIAL FOR SECONDARY BATTERY, METHOD OF PREPARING THE SAME, AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2019/005807, filed on May 15, 2019, published in Korean, which claims priority from Korean Patent Application No. 10-2018-0056751, filed on May 17, 2018, the disclosures of which are incorporated herein by reference in their entireties.

TECHNICAL FIELD

The present invention relates to a positive electrode active material for a secondary battery, a method of preparing the same, and a lithium secondary battery including the positive electrode active material.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), or a lithium iron phosphate compound ($LiFePO_4$) has been used as a positive electrode active material of the lithium secondary battery. Among these materials, since the lithium cobalt oxide ($LiCoO_2$) is advantageous in that its operating voltage is high and capacity characteristics are excellent, the lithium cobalt oxide ($LiCoO_2$) has been widely used and has been used as a positive electrode active material for high voltage. However, since there is a limitation in using a large amount of the $LiCoO_2$ as a power source for applications, such as electric vehicles, due to the rising price and unstable supply of cobalt (Co), there emerges a need to develop a positive electrode active material capable of replacing the $LiCoO_2$.

Accordingly, a nickel cobalt manganese-based lithium composite transition metal oxide (hereinafter, simply referred to as 'NCM-based lithium composite transition metal oxide'), in which a portion of cobalt (Co) is substituted with nickel (Ni) and manganese (Mn), has been developed. However, since a conventional NCM-based lithium composite transition metal oxide is generally in the form of a secondary particle in which primary particles are aggregated, its specific surface area is large, particle strength is low, and an amount of lithium by-product is large, and thus, there is a limitation in that an amount of gas generated during cell operation is large and stability is poor. Particularly, with respect to a high-Ni NCM-based lithium composite transition metal oxide in which an amount of nickel (Ni) is increased to 65 mol % or more to secure high capacity, structural and chemical stabilities are further reduced, and it is more difficult to secure thermal stability. Thus, there is still a need to develop a positive electrode active material in which stability of the high-Ni NCM-based lithium composite transition metal oxide capable of achieving high capacity is ensured.

DISCLOSURE OF THE INVENTION

Technical Problem

An aspect of the present invention provides a high-Ni NCM-based lithium composite transition metal oxide positive electrode active material having improved stability which includes nickel (Ni) in an amount of 65 mol % or more to achieve high capacity. Specifically, the present invention aims at providing a high-Ni NCM-based lithium composite transition metal oxide positive electrode active material in which particle breakage during rolling is suppressed by decreasing a specific surface area and improving particle strength, and a side reaction with an electrolyte solution is reduced by decreasing an amount of lithium by-product. Also, the present invention aims at providing a high-Ni NCM-based lithium composite transition metal oxide positive electrode active material in which an amount of gas generated during cell operation may be reduced and thermal stability is secured.

Another aspect of the present invention provides a method of easily preparing a single particle of a high-Ni NCM-based positive electrode active material despite a high manganese (Mn) content and a low cobalt (Co) content.

Technical Solution

According to an aspect of the present invention, there is provided a positive electrode active material for a secondary battery which is a lithium composite transition metal oxide including nickel (Ni), cobalt (Co), and manganese (Mn), wherein the lithium composite transition metal oxide includes the nickel (Ni) in an amount of 65 mol % or more and the manganese (Mn) in an amount of 5 mol % or more based on a total amount of transition metals, wherein the positive electrode active material is composed of a single particle, and has a crystallite size of 180 nm or more.

According to another aspect of the present invention, there is provided a method of preparing a positive electrode active material for a secondary battery which includes: preparing a precursor including nickel (Ni), cobalt (Co), and manganese (Mn) in which an amount of the nickel (Ni) is 65 mol % or more and an amount of the manganese (Mn) is 5 mol % or more based on a total amount of transition metals; pre-sintering the precursor at 600° C. to 800° C.; and mixing the pre-sintered precursor with a lithium raw material and performing secondary sintering on the mixture at a temperature of 850° C. or more to form a lithium composite transition metal oxide composed of a single particle.

According to another aspect of the present invention, there is provided a positive electrode and a lithium secondary battery which include the positive electrode active material.

Advantageous Effects

According to the present invention, a side reaction with an electrolyte solution may be reduced by decreasing a specific surface area of a high-Ni NCM-based positive electrode active material, improving particle strength, and decreasing an amount of lithium by-product. Thus, with respect to a lithium secondary battery using the high-Ni NCM-based positive electrode active material of the present invention, an amount of gas generated during cell operation may be reduced and thermal stability may be secured.

Also, according to the present invention, a single particle of a high-Ni NCM-based positive electrode active material may be easily prepared despite a high manganese (Mn) content and a low cobalt (Co) content.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

<Positive Electrode Active Material>

A positive electrode active material for a secondary battery of the present invention is a lithium composite transition metal oxide including nickel (Ni), cobalt (Co), and manganese (Mn), wherein the lithium composite transition metal oxide includes the nickel (Ni) in an amount of 65 mol % or more and the manganese (Mn) in an amount of 5 mol % or more based on a total amount of transition metals, wherein the positive electrode active material is composed of a single particle, and has a crystallite size of 180 nm or more.

The lithium composite transition metal oxide according to an embodiment of the present invention may be a high-Ni NCM-based lithium composite transition metal oxide including nickel (Ni), cobalt (Co), and manganese (Mn) in which an amount of the nickel (Ni) in a total amount of transition metals satisfies 65 mol % or more, preferably 70 mol % to less than 95 mol %, and more preferably 80 mol % to 93 mol %.

Also, an amount of the manganese (Mn) in the total amount of the transition metals in the lithium composite transition metal oxide may satisfy 5 mol % or more, preferably 5 mol % to 10 mol %, and more preferably 5 mol % to 8 mol %.

Furthermore, a concentration of the manganese (Mn) in a particle of the lithium composite transition metal oxide may be constant. Since the concentration of the manganese (Mn) is constantly distributed in the particle, thermal stability of the positive electrode active material may be excellent. In the present invention, the expression "the concentration of the manganese (Mn) in the particle is constant" is interpreted as a meaning including a case in which a difference in the concentration of the manganese (Mn) throughout the particle is 1.5 mol % or less as well as a case in which the concentration of the manganese (Mn) is the same throughout the particle.

In general, manganese (Mn) is disadvantageous in forming a layered structure and acts to inhibit particle growth due to its high oxidation number, but cobalt (Co) is an element favorable to the formation of the layered structure and plays a role in promoting the particle growth of a NCM-based lithium composite transition metal oxide. This is, when the amount of the manganese (Mn) increases, crystallite growth becomes difficult during sintering of the lithium composite transition metal oxide, and, since the cobalt (Co) promotes the crystallite growth, the formation of a single particle is difficult as the amount of the cobalt (Co) is decreased. However, according to the present invention, a single particle of the positive electrode active material may be easily formed by pre-sintering a precursor under specific conditions despite the above-described lithium composite transition metal oxide having a composition including 65 mol % or more of nickel (Ni) and 5 mol % or more of manganese (Mn). A preparation method of the present invention will be described in detail below.

As described above, the high-Ni NCM-based positive electrode active material of the present invention, which is a single particle and has a composition including 65 mol % or more of nickel (Ni) and 5 mol % or more of manganese (Mn), may simultaneously ensure excellent stability while being capable of achieving high capacity. Specifically, particle breakage during rolling may be suppressed by decreasing a specific surface area and improving particle strength, and a side reaction with an electrolyte solution may be reduced by decreasing an amount of lithium by-product. Also, since the high-Ni NCM-based positive electrode active material of the present invention may ensure excellent structural stability and chemical stability, an amount of gas generated during cell operation may be reduced and thermal stability may be secured.

The positive electrode active material of the present invention is composed of a single particle, which is not in the form of an aggregated secondary particle, that is, a primary particle. In the present invention, the expression 'primary particle' denotes a primary structure of the single particle, and the expression 'secondary particle' denotes an aggregate in which primary particles are aggregated by physical or chemical bonding between the primary particles without an intentional aggregation or assembly process of the primary particles constituting the secondary particle, that is, a secondary structure.

The primary particle may have an average particle diameter ($D_{50}$) of 2 μm to 10 μm. The primary particle may more preferably have an average particle diameter ($D_{50}$) of 3 μm to 7 μm and may most preferably have an average particle diameter ($D_{50}$) of 6 μm to 7 μm. With respect to the positive electrode active material composed of a single particle having the average particle diameter ($D_{50}$) of the primary particle, particle strength may be increased to suppress particle breakage during rolling and improve rolling density, and the amount of gas generated by the side reaction with the electrolyte solution may be reduced due to decreases in specific surface area and lithium by-product.

In the present invention, the average particle diameter ($D_{50}$) may be defined as a particle diameter at a cumulative volume of 50% in a particle size distribution curve. The average particle diameter ($D_{50}$), for example, may be measured by using a laser diffraction method. For example, in a method of measuring the average particle diameter ($D_{50}$) of the positive electrode active material, after the particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at the cumulative volume of 50% may then be calculated by the measurement instrument.

The positive electrode active material may have a crystallite size of 180 nm or more, may preferably have a crystallite size of 200 nm or more, and may more preferably have a crystallite size of 220 nm or more. The positive electrode active material satisfying the above crystallite size according to an embodiment of the present invention may suppress the particle breakage caused by rolling, and life characteristics and stability may be improved.

In the present invention, the expression 'particle' denotes a granule with a size of microns, and, when the particle is magnified and observed, the particle may be identified as 'grain' which has a crystal form with a size of a few tens of nanometers. When the grain is further magnified, it is possible to identify a separated region having a form in which atoms form a lattice structure in a predetermined direction, wherein the region is referred to as a 'crystallite', and a size of the particle observed by X-ray diffraction (XRD) is defined as a size of the crystallite. With respect to a method of measuring the crystallite size, the crystallite size may be determined by peak broadening of XRD data and may be quantitatively calculated from the Scherrer equation.

The lithium composite transition metal oxide according to the embodiment of the present invention may have a molar ratio (Li/M) of lithium (Li) to total metallic elements (M) excluding lithium of 0.98 to 1.05, preferably 1.00 to 1.04, and more preferably 1.02 to 1.03. A single particle of the positive electrode active material may be easily formed by pre-sintering the precursor under specific conditions during the preparation of the positive electrode active material and, furthermore, by controlling an amount of a lithium raw material added so as to satisfy the Li/M according to an embodiment of the present invention despite the lithium composite transition metal oxide having a composition including 65 mol % or more of nickel (Ni) and 5 mol % or more of manganese (Mn).

Also, the lithium composite transition metal oxide according to the embodiment of the present invention may further include at least one particle growth-promoting element selected from the group consisting of strontium (Sr), zirconium (Zr), magnesium (Mg), yttrium (Y), and aluminum (Al), and more preferably, may further include a particle growth-promoting element of Sr and/or Zr. The particle growth-promoting element may be included in an amount of 500 ppm to 2,000 ppm, preferably 800 ppm to 1,800 ppm, and more preferably 1,000 ppm to 1,500 ppm based on a total weight of the positive electrode active material. Since the particle growth-promoting element is included in an amount within the above range, the single particle of the positive electrode active material may be easily formed despite the lithium composite transition metal oxide having a composition including 65 mol % or more of nickel (Ni) and 5 mol % or more of manganese (Mn). In general, manganese (Mn) is disadvantageous in forming a layered structure and acts to inhibit particle growth due to its high oxidation number, but cobalt (Co) is an element favorable to the formation of the layered structure and plays a role in promoting the particle growth of a NCM-based lithium composite transition metal oxide. However, according to an embodiment of the present invention, since doping with the particle growth-promoting element may increase surface energy of the positive electrode active material, continuous particle growth may be achieved.

Furthermore, the positive electrode active material may contain a chlorine (Cl) impurity in an amount of 20 ppm or less, preferably 10 ppm or less, and more preferably 5 ppm or less. In a case in which the positive electrode active material contains the Cl impurity, an aluminum (Al) positive electrode collector may be corroded, but, since a Cl-containing raw material is not used during the preparation of the positive electrode active material according to an embodiment of the present invention, the Cl impurity may be contained in an amount of 20 ppm or less.

Specifically, the lithium composite transition metal oxide according to the embodiment of the present invention may be represented by Formula 1 below.

$$Li_{1+p}[Ni_{1-(x1+y1+z1)}Co_{x1}Mn_{y1}M^a_{z1}]_{1-p}O_2 \qquad \text{[Formula 1]}$$

In Formula 1, $M^a$ is at least one element selected from the group consisting of Sr, Zr, Mg, Y, and Al, and $-0.02 \le p \le 0.05$, $0 < x1 \le 0.4$, $0.05 \le y1 \le 0.4$, $0 \le z1 \le 0.1$, and $0.05 < x1+y1+z1 \le 0.35$.

In the lithium composite transition metal oxide of Formula 1, Li may be included in an amount corresponding to 1+p, that is, $0.98 \le 1+p \le 1.05$. When 1+p is less than 0.98, capacity may be reduced, and, when 1+p is greater than 1.05, resistance may increase due to a lot of Li reside on the surface of the positive electrode active material. The Li may more preferably be included in an amount satisfying $1.0 \le 1+p \le 1.04$, in consideration of a capacity characteristics improvement effect of the positive electrode active material and an effect of forming a single particle during the preparation of the active material due to the control of the amount of the Li.

In the lithium composite transition metal oxide of Formula 1, Ni may be included in an amount corresponding to $1-(x1+y1+z1)$, for example, $0.65 \le 1-(x1+y1+z1) < 0.95$. The Ni may more preferably be included in an amount satisfying $0.70 \le 1-(x1+y1+z1) < 0.95$.

In the lithium composite transition metal oxide of Formula 1, Co may be included in an amount corresponding to x1, that is, $0 \le x1 \le 0.4$. In a case in which the amount of the Co in the lithium composite transition metal oxide of Formula is greater than 0.4, there is a concern that cost may increase. The Co may specifically be included in an amount satisfying $0.1 \le x1 \le 0.3$ in consideration of a significant capacity characteristics improvement effect due to the inclusion of the Co.

In the lithium composite transition metal oxide of Formula 1, Mn may be included in an amount corresponding to y1, that is, $0.05 \le y1 \le 0.4$. Mn may improve stability of the positive electrode active material, and, as a result, may improve stability of the battery. The Mn may specifically be included in an amount satisfying $0.05 \le y1 \le 0.2$.

In the lithium composite transition metal oxide of Formula 1, $M^a$ may be a doping element included in a crystal structure of the lithium composite transition metal oxide, wherein the $M^a$ may be included in an amount corresponding to z1, that is, 0≤z1≤0.1.

The positive electrode active material according to the embodiment of the present invention may contain a residual lithium by-product in an amount of 0.5 wt % or less, preferably 0.48 wt % or less, and more preferably 0.46 wt % or less based on the total weight of the positive electrode active material.

Since the above specific surface area and/or amount of the lithium by-product is satisfied, the side reaction with the electrolyte solution may be reduced and the amount of the gas generated during cell operation may be reduced.

When the positive electrode active material is thermally analyzed by differential scanning calorimetry (DSC), the positive electrode active material produces a main peak with a maximum heat flow at 235° C. or more, preferably 235° C. to 240° C., and more preferably 236° C. to 238° C. Accordingly, it may be confirmed that the positive electrode active material according to the embodiment of the present invention secures excellent thermal stability.

Furthermore, with respect to the positive electrode active material according to the embodiment of the present invention, a coating portion including at least one selected from the group consisting of Al, boron (B), Zr, titanium (Ti), Mg, tantalum (Ta), niobium (Nb), molybdenum (Mo), and chromium (Cr) may be formed on the surface of the particle including the lithium composite transition metal oxide. The coating portion may preferably include Al, B, and/or Nb, and may more preferably include Al. Since the coating portion is further formed, the lithium by-product on the surface of the particle may be further reduced and the amount of the gas generated during cell operation may be further reduced.

<Method of Preparing Positive Electrode Active Material>

Next, a method of preparing the positive electrode active material of the present invention will be described.

The positive electrode active material of the present invention is prepared by including the steps of: preparing a precursor including nickel (Ni), cobalt (Co), and manganese (Mn) in which an amount of the nickel (Ni) is 65 mol % or more and an amount of the manganese (Mn) is 5 mol % or more based on a total amount of transition metals; pre-sintering the precursor at 600° C. to 800° C.; and mixing the pre-sintered precursor with a lithium raw material and performing secondary sintering on the mixture at a temperature of 850° C. or more to form a lithium composite transition metal oxide composed of a single particle.

The method of preparing the positive electrode active material will be described in detail for each step.

First, a precursor including nickel (Ni), cobalt (Co), and manganese (Mn), in which an amount of the nickel (Ni) is 65 mol % or more and an amount of the manganese (Mn) is 5 mol % or more based on a total amount of transition metals, is prepared.

The positive electrode active material precursor may be used by purchasing a commercially available positive electrode active material precursor, or may be prepared according to a method of preparing a positive electrode active material precursor which is well known in the art.

For example, the precursor may be prepared by a co-precipitation reaction by adding an ammonium cation-containing complexing agent and a basic compound to a transition metal solution including a nickel-containing raw material, a cobalt-containing raw material, and a manganese-containing raw material.

The nickel-containing raw material, for example, may include nickel-containing acetic acid salts, nitrates, sulfates, halides, sulfides, hydroxides, oxides, or oxyhydroxides, and may specifically include $Ni(OH)_2$, NiO, NiOOH, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, a nickel halide, or a combination thereof, but the present invention is not limited thereto.

The cobalt-containing raw material may include cobalt-containing acetic acid salts, nitrates, sulfates, halides, sulfides, hydroxides, oxides, or oxyhydroxides, and may specifically include $Co(OH)_2$, CoOOH, $Co(OCOCH_3)_2 \cdot 4H_2O$, $Co(NO_3)_2 \cdot 6H_2O$, $Co(SO_4)_2$, $Co(SO_4)_2 \cdot 7H_2O$, or a combination thereof, but the present invention is not limited thereto.

The manganese-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The transition metal solution may be prepared by adding the nickel-containing raw material, the cobalt-containing raw material, and the manganese-containing raw material to a solvent, specifically water, or a mixture of water and an organic solvent (e.g., alcohol etc.) which may be uniformly mixed with the water, or may be prepared by mixing an aqueous solution of the nickel-containing raw material, an aqueous solution of the cobalt-containing raw material, and the manganese-containing raw material.

The ammonium cation-containing complexing agent, for example, may include $NH_4OH$, $(NH_4)_2SO_4$, $NH_4NO_3$, $NH_4Cl$, $CH_3COONH_4$, $NH_4CO_3$, or a combination thereof, but the present invention is not limited thereto. The ammonium cation-containing complexing agent may be used in the form of an aqueous solution, and, in this case, water or a mixture of water and an organic solvent (specifically, alcohol etc.), which may be uniformly mixed with the water, may be used as a solvent.

The basic compound may include a hydroxide of alkali metal or alkaline earth metal, such as NaOH, KOH, or $Ca(OH)_2$, a hydrate thereof, or a combination thereof. The basic compound may also be used in the form of an aqueous solution, and, in this case, water or a mixture of water and an organic solvent (specifically, alcohol etc.), which may be uniformly mixed with the water, may be used as a solvent.

The basic compound is added to adjust a pH of a reaction solution, wherein the basic compound may be added in an amount such that the pH of the metal solution is 11 to 13.

The co-precipitation reaction may be performed in a temperature range of 40° C. to 70° C. in an inert atmosphere such as nitrogen or argon.

Particles of a nickel-cobalt-manganese hydroxide are formed by the above-described process, and are precipitated in the reaction solution. Concentrations of the nickel-containing raw material, the cobalt-containing raw material, and the manganese-containing raw material may be adjusted to prepare a precursor in which the amount of the nickel (Ni) is 65 mol % or more and the amount of the manganese (Mn) is 5 mol % or more based on the total amount of the transition metals. The precipitated nickel-cobalt-manganese hydroxide particles may be separated according to a conventional method and dried to prepare a nickel-cobaltmanganese precursor. The precursor may be a secondary particle which is formed by aggregation of primary particles, and the precursor secondary particle may have an average particle diameter ($D_{50}$) of 3 μm to 6 μm, preferably 3 μm to 5 μm, and more preferably 3 μm to 4 μm.

Next, the precursor is pre-sintered at 600° C. to 800° C. The precursor may more preferably be pre-sintered at 630° C. to 780° C., for example, 650° C. to 750° C. Since the precursor is pre-sintered within the above temperature range, gas in the secondary particle may be removed and a binding force between metal ions and oxygen may be secured. Since the stable binding force between the metal ions and the oxygen is secured, thermal energy may be used in particle growth during the subsequent sintering. Thus, since the precursor is subjected to the pre-sintering, a single particle may be easily formed during the secondary sintering which is performed after the mixing with the lithium raw material. In a case in which the pre-sintering temperature is less than 600° C., the metal ion and the oxygen may not be sufficiently bonded to each other, and, in a case in which the pre-sintering temperature is greater than 800° C., separation of metal oxide layers may occur.

The pre-sintering may be performed for 4 hours to 8 hours, and may more preferably be performed for 5 hours to 7 hours. The pre-sintering may be performed in air atmosphere or an oxygen atmosphere.

Next, the pre-sintered precursor is mixed with a lithium raw material and secondary sintering is performed on the mixture at a temperature of 850° C. or more to form a lithium composite transition metal oxide composed of a single particle. A single particle may be formed by performing secondary sintering on the pre-sintered precursor with the lithium raw material at a temperature of 850° C. or more, and specifically, a single particle having the average particle ($D_{50}$) of the primary particle of 2 μm to 10 μm may be formed.

As the lithium raw material, lithium-containing sulfates, nitrates, acetic acid salts, carbonates, oxalates, citrates, halides, hydroxides, or oxyhydroxides may be used, and these materials are not particularly limited as long as they may be dissolved in water. Specifically, the lithium source may include $Li_2CO_3$, $LiNO_3$, $LiNO_2$, $LiOH$, $LiOH·H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$, and any one thereof or a mixture of two or more thereof may be used.

The lithium raw material may be mixed such that a molar ratio (Li/M) of lithium (Li) to total metallic elements (M) excluding lithium of the lithium composite transition metal oxide is in a range of 0.98 to 1.05. The lithium raw material may be mixed such that the Li/M is more preferably in a range of 1.00 to 1.04, for example, 1.02 to 1.03. Since an amount of the lithium raw material added is adjusted such that the Li/M satisfies the above range, a single crystal of the positive electrode active material may be easily formed despite the lithium composite transition metal oxide having a composition including 65 mol % or more of nickel (Ni) and 5 mol % or more of manganese (Mn).

The secondary sintering may be performed at a temperature of 850° C. or more, preferably 880° C. to 980° C., and more preferably 870° C. to 900° C. The secondary sintering may be performed for 6 hours to 24 hours, preferably 7 hours to hours, and more preferably 8 hours to 12 hours. The secondary sintering may be performed in an oxygen atmosphere or an air atmosphere, and may more preferably be performed in an oxygen atmosphere.

When the secondary sintering, the sintering may be performed after further mixing a particle growth promoter including at least one particle growth-promoting element selected from the group consisting of Sr, Zr, Mg, Y, and Al, and more preferably, a particle growth promoter including a particle growth-promoting element of Sr and/or Zr may be further mixed. The particle growth promoter may be mixed such that the particle growth-promoting element may be included in an amount of 500 ppm to 2,000 ppm, preferably 800 ppm to 1,800 ppm, and more preferably 1,000 ppm to 1,500 ppm based on the total weight of the positive electrode active material. Since the particle growth promoter is further mixed within the above range, the single particle of the positive electrode active material may be easily formed despite the lithium composite transition metal oxide having a composition including 65 mol % or more of nickel (Ni) and 5 mol % or more of manganese (Mn).

The secondary sintering may be performed such that the primary particle of the prepared single particle of the NCM-based positive electrode active material has an average particle diameter ($D_{50}$) of 2 μm to 10 μm. The sintering may more preferably be performed such that the primary particle has an average particle diameter ($D_{50}$) of 3 μm to 7 μm, for example, 6 μm to 7 μm.

Next, in order to remove lithium by-products present on the surface of the lithium composite transition metal oxide, a process of washing the lithium composite transition metal oxide may further be performed.

With respect to a lithium composite transition metal oxide containing a high concentration of nickel, since it is structurally unstable in comparison to a lithium composite transition metal oxide containing a low nickel content, more lithium by-products, such as unreacted lithium hydroxide or lithium carbonate, are generated in a preparation process. In a case in which a large amount of the lithium by-products is present in the positive electrode active material, the lithium by-products react with the electrolyte solution to generate gas and cause a swelling phenomenon, and, as a result, high-temperature stability is significantly reduced. Thus, a washing process for removing the lithium by-products from the lithium composite transition metal oxide containing a high concentration of nickel may further be performed.

The washing process, for example, may be performed by a method of adding the lithium composite transition metal oxide to ultrapure water and stirring. In this case, washing temperature may be 20° C. or less, for example, 10° C. to 20° C., and washing time may be in a range of about 10 minutes to about 1 hour. When the washing temperature and the washing time respectively satisfy the above ranges, the lithium by-products may be effectively removed.

Next, a coating portion may be formed by selectively mixing the lithium composite transition metal oxide and a coating raw material including at least one selected from the group consisting of Al, B, Zr, Ti, Mg, Ta, Nb, Mo, and Cr and performing a heat treatment. The coating raw material may preferably include Al, B, and/or Nb, and may more preferably include Al. In a case in which the coating raw material is Al, for example, $Al(OH)_3$, $Al_2O_3$, $AlPO_4$, $AlCl_3$, and $Al_2(SO_4)_3$ may be used.

The heat treatment may be performed in a temperature range of 250° C. to 350° C., and may more preferably be performed in a temperature range of 270° C. to 300° C. The heat treatment may be performed for 4 hours to 6 hours.

Since the coating portion is further formed, the lithium by-products on the surface of the particle may be further reduced and the amount of the gas generated during cell operation may be further reduced.

<Positive Electrode and Secondary Battery>

According to another embodiment of the present invention, provided are a positive electrode for a secondary battery and a lithium secondary battery which include the above positive electrode active material.

Specifically, the positive electrode includes a positive electrode collector and a positive electrode active material layer which is disposed on the positive electrode collector and includes the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Also, as another method, the positive electrode may be prepared by casting the composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode in the form of a slurry, which includes selectively the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta(0<\beta<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

In a 5 L batch-type reactor set at 60° C., $NiSO_4$, $CoSO_4$, and $MnSO_4$ were mixed in water in amounts such that a molar ratio of nickel:cobalt:manganese was 82:12:6 to prepare a precursor-forming solution with a concentration of 2.4 M.

1 L of deionized water was put in a co-precipitation reactor (capacity 5 L), the reactor was then purged with nitrogen gas at a rate of 2 L/min to remove dissolved oxygen in the water and create a non-oxidizing atmosphere in the reactor. Thereafter, 10 ml of a 25% NaOH aqueous solution was added, and stirring was then performed at a speed of 1,200 rpm and a temperature of 60° C. to maintain a pH at 12.0.

Subsequently, a co-precipitation reaction was performed for 18 hours while adding the precursor-forming solution at a rate of 180 ml/hr together with a NaOH aqueous solution and a $NH_4OH$ aqueous solution to form particles of a nickel-cobalt-manganese-containing hydroxide ($Ni_{0.82}Co_{0.12}Mn_{0.06}(OH)_2$). The hydroxide particles were separated, washed, and then dried in an oven at 120° C. to prepare a positive electrode active material precursor ($D_{50}$=4 μm). The positive electrode active material precursor thus prepared was in the form of a secondary particle in which primary particles were aggregated.

The positive electrode active material precursor thus prepared was pre-sintered at 700° C. for 5 hours in an air atmosphere. Thereafter, the pre-sintered positive electrode active material precursor and a lithium raw material, LiOH, were added to a Henschel mixer (700 L) such that a final molar ratio of Li/M(Ni,Co,Mn) was 1.02, and were mixed at a center speed of 300 rpm for 20 minutes. The mixed powder was put in an alumina crucible with a size of 330 mm×330 mm and secondarily sintered at 880° C. for 10 hours in an oxygen (02) atmosphere to form a lithium composite transition metal oxide.

300 g of the lithium composite transition metal oxide thus prepared was added to 300 mL of ultrapure water and stirred for 30 minutes to wash the lithium composite transition metal oxide, and the washed lithium composite transition metal oxide was filtered for 20 minutes. The filtered lithium composite transition metal oxide was dried at 130° C. for 10 hours in a vacuum oven and then sieved to prepare a positive electrode active material. The positive electrode active material thus prepared contained 5 ppm of chlorine (Cl) as an impurity.

Example 2

A positive electrode active material was prepared in the same manner as in Example 1 except that, during the secondary sintering, the sintering was performed after $SrCO_3$ was further mixed such that a concentration became 1,200 ppm based on a total weight of the positive electrode active material.

Example 3

A positive electrode active material was prepared in the same manner as in Example 2 except that pre-sintering temperature was set at 600° C.

Example 4

A positive electrode active material was prepared in the same manner as in Example 1 except that pre-sintering temperature was set at 780° C.

Example 5

A positive electrode active material was prepared in the same manner as in Example 1 except that, during the secondary sintering, a lithium raw material, LiOH, was mixed such that a final Li/M(Ni,Co,Mn) molar ratio was 1.01.

Example 6

A positive electrode active material was prepared in the same manner as in Example 1 except that, during the secondary sintering, a lithium raw material, LiOH, was mixed such that a final Li/M(Ni,Co,Mn) molar ratio was 1.04.

Comparative Example 1

A positive electrode active material was prepared in the same manner as in Example 1 except that a lithium composite transition metal oxide was formed by mixing a positive electrode active material precursor, which was not pre-sintered, with a lithium raw material and then sintering the mixture at 880° C. for 10 hours in an oxygen (02) atmosphere.

Comparative Example 2

A positive electrode active material was prepared in the same manner as in Example 1 except that a lithium composite transition metal oxide was formed by mixing a positive electrode active material precursor, which was not pre-sintered, with a lithium raw material and then sintering the mixture at 770° C. for 10 hours in an oxygen (02) atmosphere.

Comparative Example 3

A positive electrode active material was prepared in the same manner as in Example 1 except that pre-sintering temperature was set at 400° C.

Comparative Example 4

A positive electrode active material was prepared in the same manner as in Example 1 except that pre-sintering temperature was set at 1,000° C.

Experimental Example 1: Positive Electrode Active Material Observation

Magnified scanning electron microscope (SEM) images of the positive electrode active materials prepared in Examples 1 and 2 and Comparative Examples 1 and 2 are illustrated in FIGS. 1 to 4.

Referring to FIGS. 1 to 4, the positive electrode active materials prepared in Examples 1 and 2 of the present invention formed a primary structure of a single particle, but it may be confirmed that Comparative Examples 1 and 2, in which the precursor was not pre-sintered, were in the form of a secondary particle in which primary particles were aggregated to each other. With respect to FIG. 3 (Comparative Example 1), primary particles were significantly grown, but a single crystal was not formed and it was still in the form of an aggregated secondary particle.

Experimental Example 2: Specific Surface Area, Primary Particle Diameter, and Crystallite Size of Positive Electrode Active Material Specific surface areas, primary particle diameters, and crystallite sizes of the positive electrode active materials prepared in Examples 1 to 6 and Comparative Examples 1 to 4 were measured. The primary particle diameters of Examples 1 to 6 were measured using a laser diffraction method, the primary particle diameters of Comparative Examples 1 to 4 were measured using SEM images, and the crystallite sizes were measured by XRD and their values were calculated.

TABLE 1

|  | The presence of single particle | Primary particle (μm) | Crystallite size (nm) |
| --- | --- | --- | --- |
| Example 1 | ○ | $D_{50}$ 6.5 | 220 |
| Example 2 | ○ | $D_{50}$ 7.0 | 250 |
| Example 3 | ○ | $D_{50}$ 6.2 | 230 |
| Example 4 | ○ | $D_{50}$ 6.6 | 230 |
| Example 5 | ○ | $D_{50}$ 6.2 | 215 |
| Example 6 | ○ | $D_{50}$ 6.0 | 215 |
| Comparative Example 1 | x | 1 to 4 | 180 |
| Comparative Example 2 | x | 0.5 to 1 | 150 |
| Comparative Example 3 | x | 1 to 4 | 190 |
| Comparative Example 4 | x | 2 to 5 | 220 |

Referring to Table 1, the positive electrode active materials prepared in Examples 1 to 6 were in the form of a single particle, but the positive electrode active materials prepared in Comparative Examples 1 to 4 were not in the form of a single particle, but in the form of an aggregated secondary particle. Also, the crystallite sizes of the positive electrode active materials of Examples 1 to 6 were greater than those of the positive electrode active materials of Comparative Examples 1 to 3.

Experimental Example 3: Lithium by-Products Measurement

After 5 g of each of the positive electrode active materials prepared in Examples 1 to 6 and Comparative Examples 1 to 4 was dispersed in 100 mL of water, a change in pH was measured while the solution was titrated with 0.1 M HCl to obtain a pH titration curve. A residual amount of LiOH and a residual amount of $Li_2CO_3$ in each positive electrode active material were calculated by using the pH titration curve, and a sum of these values was evaluated as a total residual amount of lithium by-products and is listed in Table 2 below.

TABLE 2

|  | Lithium by-products residual amount (wt %) |
| --- | --- |
| Example 1 | 0.44 |
| Example 2 | 0.40 |
| Example 3 | 0.45 |
| Example 4 | 0.46 |
| Example 5 | 0.38 |
| Example 6 | 0.35 |
| Comparative Example 1 | 0.6 |
| Comparative Example 2 | 0.7 |
| Comparative Example 3 | 0.65 |
| Comparative Example 4 | 0.7 |

Referring to Table 2, the positive electrode active materials prepared in Examples 1 to 3 had an amount of lithium by-products of 0.5 wt % or less, wherein the amounts of the lithium by-products were reduced in comparison to those of Comparative Examples 1 to 4.

Experimental Example 4: Thermal Stability Evaluation

A heat flow according to the temperature was measured for the positive electrode active materials of Examples 1 to 3 and Comparative Examples 1 and 2 using a differential scanning calorimeter (Sensys evo DSC, SETARAM Instrumentation). Specifically, 16 mg of each of the positive electrode active materials of Examples 1 to 3 and Comparative Examples 1 and 2 was put in a pressure-resistant pan for DSC measurement and 20 μL of an electrolyte solution (EVPS) was then injected. A temperature range for DSC analysis was set at 25° C. to 400° C., and a heating rate was set at 10° C./min. DSC measurement was performed more than three times on each of the positive electrode active materials to calculate an average value. Measurement results are presented in Table 3 and FIG. 5.

TABLE 3

|  | Main peak measurement temperature (° C.) |
| --- | --- |
| Example 1 | 235 |
| Example 2 | 236 |
| Example 3 | 235 |
| Comparative Example 1 | 225 |
| Comparative Example 2 | 220 |

Figure 1:
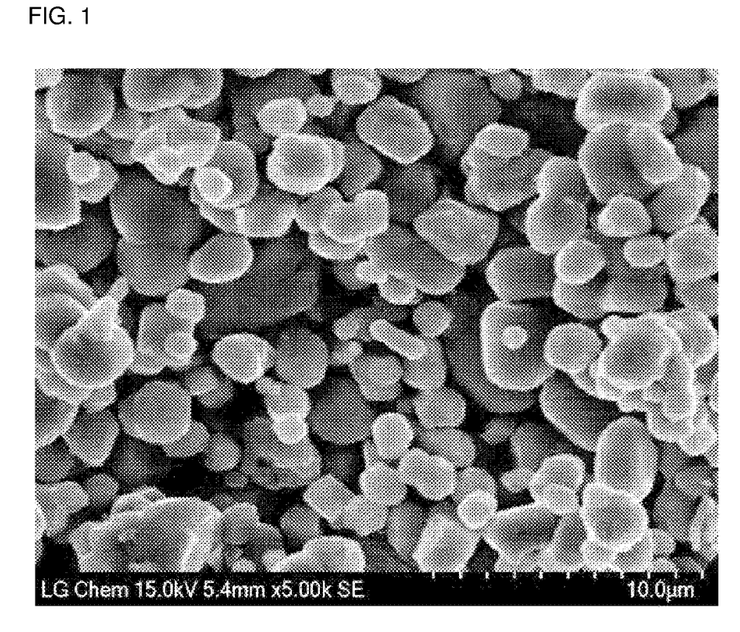
FIGS. 1 through 4 are magnified scanning electron microscope (SEM) images of positive electrode active materials prepared in Examples 1 and 2 and Comparative Examples 1 and 2.
Figure 2:
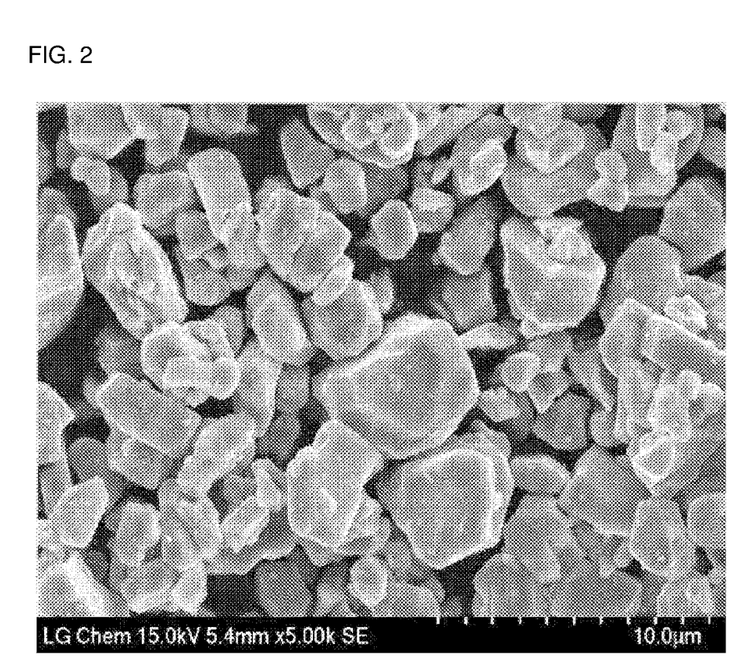
Figure 3:
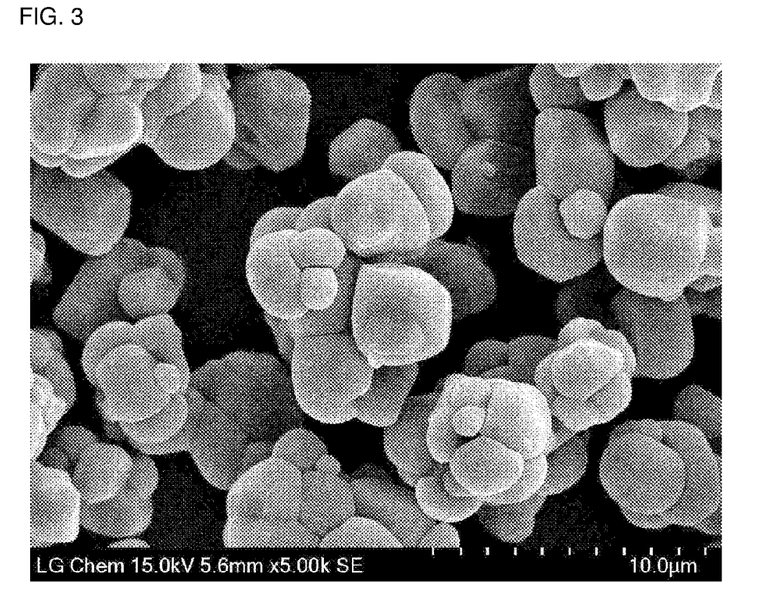
Figure 4:
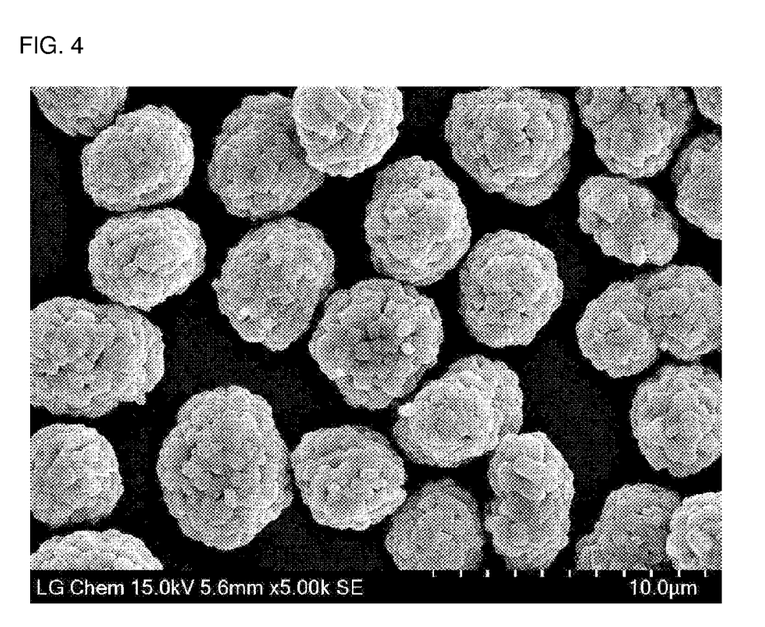
Figure 5:
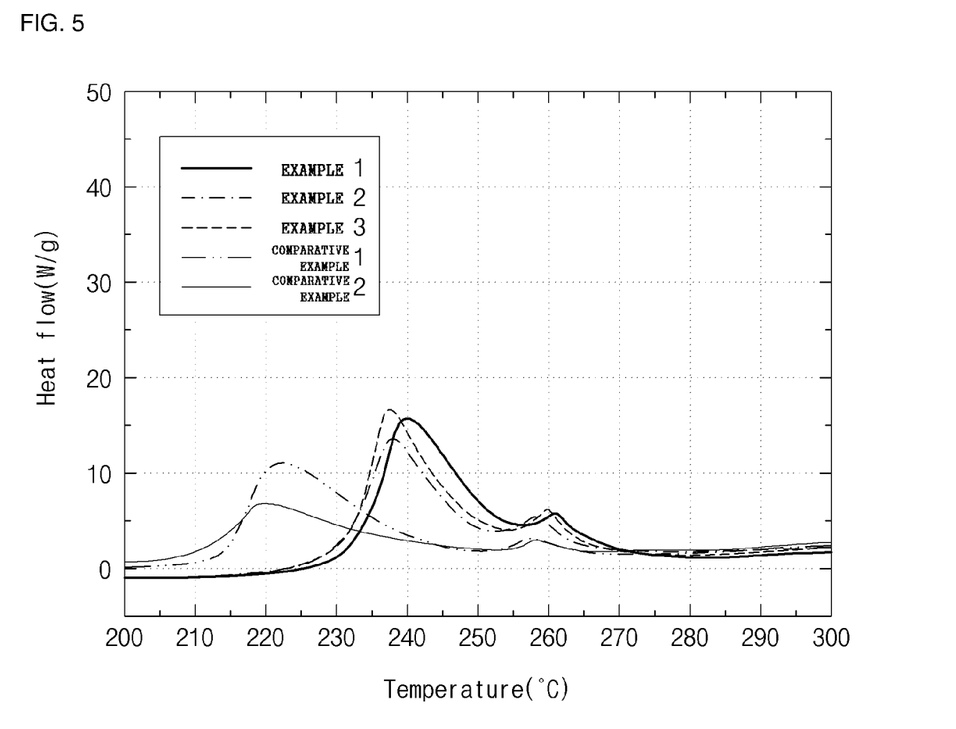
FIG. 5 is a graph in which heat flow vs. temperature of positive electrode active materials of Examples 1 to 3 and Comparative Examples 1 and 2 are measured using a differential scanning calorimeter (Sensys evo DSC, SETARAM Instrumentation)
Figure 6:
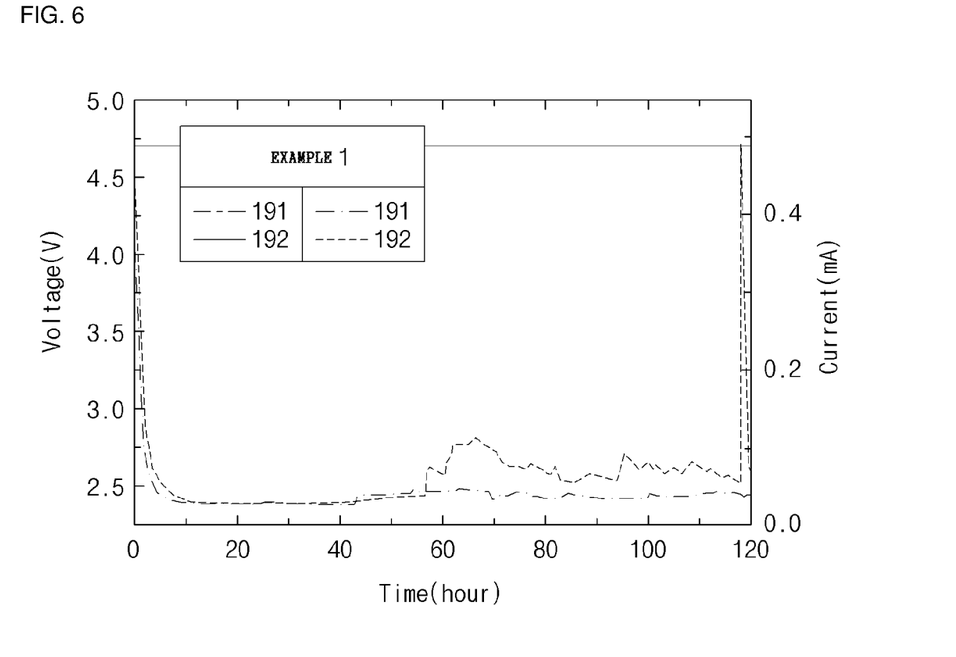
FIGS. 6 through 9 are graphs in which leakage currents of lithium secondary battery cells (full cells) using positive electrodes prepared according to Examples 1 and 2 and Comparative Examples 1 and 2 are measured.
Figure 7:
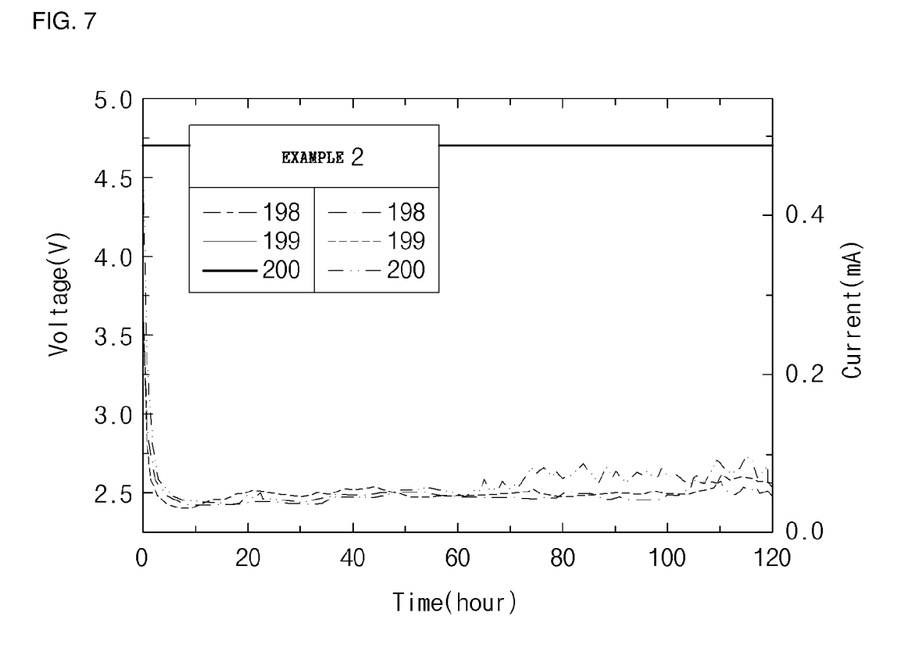
Figure 8:
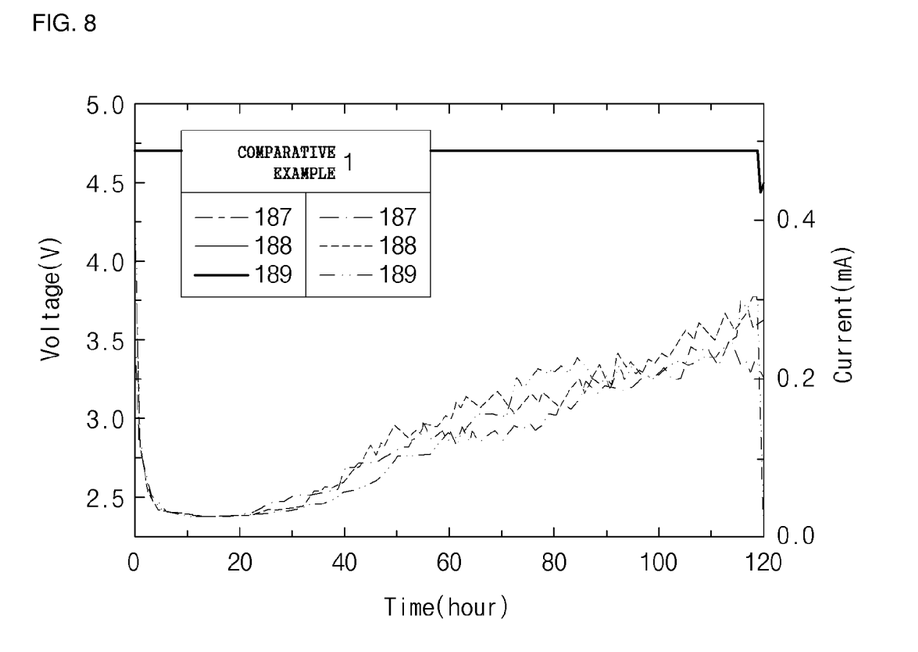
Figure 9:
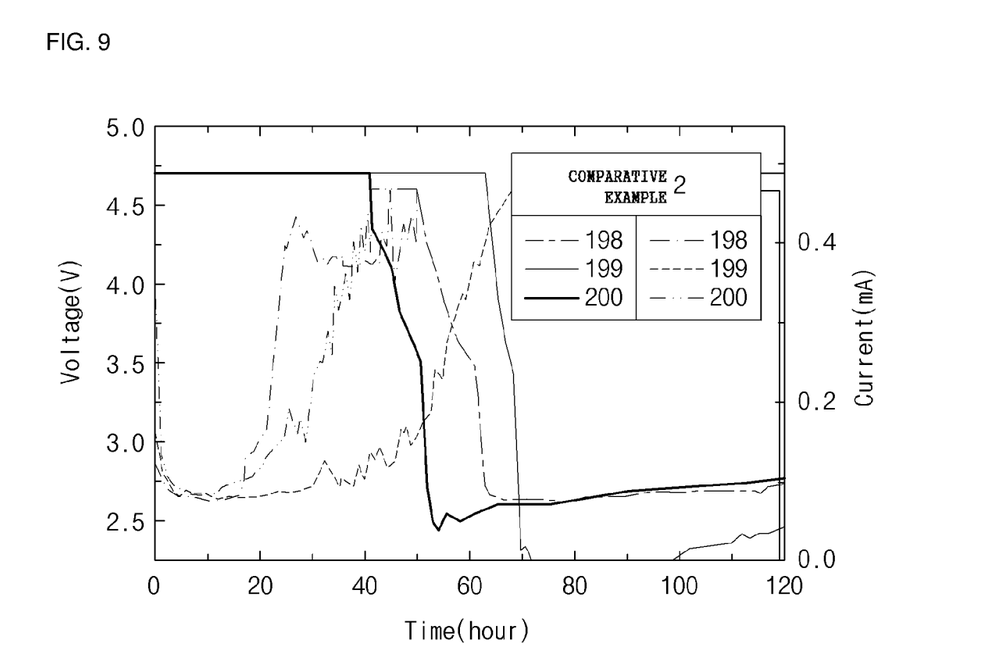

Referring to Table 3 and FIG. 5, with respect to the positive electrode active materials of Examples 1 to 3, main peaks appeared at 235° C. or more, but, with respect to the positive electrode active materials of Comparative Examples 1 and 2, it may be confirmed that main peaks appeared at about 220° C. to about 225° C. which were relatively lower temperatures. This indicated that the positive electrode active materials of Examples 1 to 3 had better thermal stabilities than the positive electrode active materials of Comparative Examples 1 and 2.

Experimental Example 5: Leakage Current Evaluation

Each of the positive electrode active materials prepared in Examples 1 to 6 and Comparative Examples 1 to 4, a carbon black conductive agent, and a PVdF binder were mixed in an N-methylpyrrolidone solvent at a weight ratio of 96:2:2 to prepare a positive electrode material mixture (viscosity: 5,000 mPa·s), and one surface of an aluminum current collector was coated with the positive electrode material mixture, dried at 130° C., and then rolled to prepare a positive electrode.

Lithium metal was used as a negative electrode.

Each lithium secondary battery was prepared by preparing an electrode assembly by disposing a porous polyethylene separator between the positive electrode and negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/ethylmethyl carbonate/diethyl carbonate (mixing volume ratio of EC/EMC/DEC=3/4/3).

Charge and discharge experiments were performed on each lithium secondary battery half cell prepared as described above. Specifically, after each half cell was charged and discharged at 0.2 C/0.2 C and 50° C., each half cell was charged at 0.2 C to a voltage of 4.7 V in a constant current/constant voltage (CCCV) mode, termination was set at 130 hours, an average leakage current was then obtained by dividing capacity for 130 hours by time, and the results thereof are presented in Table 4 and FIGS. 6 to 9 below.

TABLE 4

|  | Charge capacity (mAh/g) | Discharge capacity (mAh/g) | Average leakage current (mAh/hr, 130 hr) |
|---|---|---|---|
| Example 1 | 224 | 204 | 0.08 |
| Example 2 | 223 | 202 | 0.05 |
| Example 3 | 225 | 205 | 0.05 |
| Example 4 | 224 | 205 | 0.04 |
| Example 5 | 225 | 204 | 0.06 |
| Example 6 | 225 | 204 | 0.06 |
| Comparative Example 1 | 225 | 205 | 0.15 |
| Comparative Example 2 | 225 | 207 | 0.23 |
| Comparative Example 3 | 225 | 205 | 0.18 |
| Comparative Example 4 | 220 | 195 | — |

Referring to Table 4 and FIGS. 6 to 9, in a case in which the positive electrode active materials of Examples 1 to 6 were used, it may be confirmed that charge and discharge capacities were excellent and leakage current hardly occurred. In contrast, in a case in which the positive electrode active materials of Comparative Examples 1 to 3 were used, it may be understood that an amount of leakage current during 130 hours was significantly increased. With respect to Comparative Example 4, since the pre-sintering temperature was excessively high, phase separation of Ni, Co, and Mn occurred, and thus, it seems that less capacity was obtained.

Experimental Example 6: High-Temperature Storage Characteristics Evaluation

Each of the lithium secondary battery half cells prepared as in Experimental Example 5 by using each of the positive electrode active materials prepared in Examples 1 to 6 and Comparative Examples 1 to 3 was charged at 0.5 C to a voltage of 4.4 V in a CCCV mode (termination current of 1/20 C). Two positive electrodes thus charged and two polyethylene separators were alternatively stacked on a coin cell bottom plate. Thereafter, a coin cell, which was prepared by injecting an electrolyte solution and then being covered with a gasket, was put in an aluminum pouch and vacuum-sealed. Thereafter, gas generated during storage at 60° C. for 2 weeks was measured using a gas chromatograph-mass spectrometer (GC-MS). The results thereof are presented in Table 6 below.

TABLE 6

|  | Amount of gas generated during high-temperature storage (μl/g) |
|---|---|
| Example 1 | 2,000 |
| Example 2 | 1,800 |
| Example 3 | 1,850 |
| Example 4 | 1,850 |
| Example 5 | 2,000 |
| Example 6 | 1,900 |
| Comparative Example 1 | 3,500 |
| Comparative Example 2 | 4,800 |
| Comparative Example 3 | 3,200 |

Referring to Table 6, with respect to the positive electrode active materials prepared in Examples 1 to 6, amounts of gas generated during high-temperature storage were significantly reduced in comparison to those of the positive electrode active materials prepared in Comparative Examples 1 to 3.

The invention claimed is:

1. A positive electrode active material for a secondary battery, the positive electrode active material comprising:
   a lithium composite transition metal oxide including nickel (Ni), cobalt (Co), and manganese (Mn),
   wherein the lithium composite transition metal oxide comprises the nickel (Ni) in an amount of 65 mol % or more and the manganese (Mn) in an amount of 5 mol % or more based on a total amount of transition metals,
   wherein the positive electrode active material comprises a single particle having a crystallite size of 180 nm or more, wherein the single particle is polycrystalline and wherein the single particle is a primary particle,
   wherein the positive electrode active material contains an amount of a chlorine (Cl) impurity of 20 ppm or less, and
   wherein the positive active material has an average particle diameter ($D_{50}$) of from 3 μm to 7 μm.

2. The positive electrode active material claim 1, wherein the positive electrode active material contains an amount of residual lithium by-products of 0.5 wt % or less based on a total weight of the positive electrode active material.

3. The positive electrode active material claim 1, wherein the positive electrode active material produces a main peak with a maximum heat flow at 235° C. or more when the positive electrode active material is thermally analyzed by differential scanning calorimetry (DSC).

4. A method of preparing the positive electrode active material of claim 1, the method comprising:
   preparing a precursor including nickel (Ni), cobalt (Co), and manganese (Mn) in which an amount of the nickel (Ni) is 65 mol % or more and an amount of the manganese (Mn) is 5 mol % or more based on a total amount of transition metals;

pre-sintering the precursor at 600° C. to 800° C. to form a pre-sintered precursor; and forming a mixture of the pre-sintered precursor with a lithium raw material and performing secondary sintering on the mixture at a temperature of 850° C. or more to form the lithium composite transition metal oxide.

5. The method of claim 4, wherein the pre-sintering is performed for 4 hours to 8 hours.

6. The method of claim 4, wherein the precursor is a secondary particle which is formed by aggregation of primary particles, and the secondary particle has an average particle diameter ($D_{50}$) of 3 μm to 6 μm.

7. The method of claim 4, wherein the secondary sintering is performed at 880° C. to 980° C.

8. The method of claim 4, wherein the lithium raw material is mixed with the pre-sintered precursor such that a molar ratio (Li/M) of lithium (Li) to total metallic elements (M) excluding lithium of the lithium composite transition metal oxide is in a range of 0.98 to 1.05.

9. The method of claim 4, wherein the secondary sintering is performed after mixing the pre-sintered precursor and the lithium raw material with a particle growth promoter including at least one particle growth-promoting element selected from the group consisting of: strontium (Sr), zirconium (Zr), magnesium (Mg), yttrium (Y), and aluminum (Al).

10. The method of claim 9, wherein the particle growth-promoting element is included in the positive electrode active material in an amount of 500 ppm to 2,000 ppm based on a total weight of the positive electrode active material.

11. The method of claim 4, wherein primary particles of the positive electrode active material have an average particle diameter ($D_{50}$) of 2 μm to 10 μm.

12. A positive electrode for a secondary battery, the positive electrode comprising the positive electrode active material of claim 1.

* * * * *